Feb. 21, 1933.    H. E. SMYSER    1,898,023
HYDRAULIC TURBINE
Filed Jan. 29, 1932    5 Sheets-Sheet 4

INVENTOR
HARRY E. SMYSER.
BY
ATTORNEY

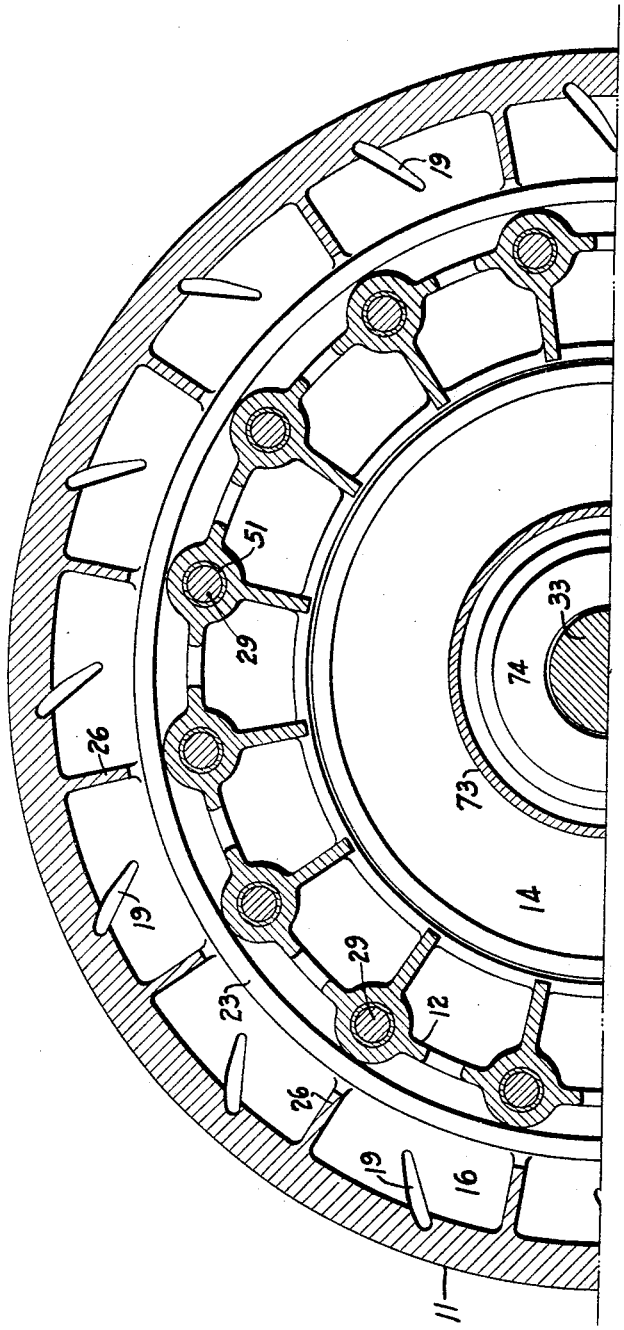

Patented Feb. 21, 1933

1,898,023

UNITED STATES PATENT OFFICE

HARRY E. SMYSER, OF YORK, PENNSYLVANIA, ASSIGNOR TO S. MORGAN SMITH COMPANY, OF YORK, PENNSYLVANIA, A CORPORATION OF PENNSYLVANIA

HYDRAULIC TURBINE

Application filed January 29, 1932. Serial No. 589,561.

This invention relates to hydraulic turbines of the type having an oil bearing for the runner shaft.

An object of the invention is to provide an improved water tight oil bearing for the runner shaft of hydraulic turbines.

Another object of the invention is to provide an improved hydraulic turbine in which the runner shaft bearing is positioned near the center of gravity of the turbine runner.

Another object of the invention is to provide an improved hydraulic turbine in which the packing box associated with the runner shaft bearing is so located as to be readily accessible for inspection and adjustment.

Another object of the invention is to provide an improved hydraulic turbine of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 5 is a half horizontal section taken on the line 5—5 of Figure 1.

Heretofore, when the runner shafts of hydraulic turbines were equipped with oil bearings, due to the fact that turbulent water is present in considerable quantities above the hub or crown of the runners, it has been the custom to mount the oil bearings at a considerable distance above the top of the runners, so as to prevent the water, which is thrown upwardly by the revolving runners, from mixing with the oil in the bearings. In such prior constructions, the packing boxes were usually located beneath the oil bearings so as to prevent the passage of the water upwardly towards the bearings. With the packing boxes thus located beneath the bearings, it was difficult to maintain the packing boxes tight, due to their inaccessibility. Therefore, when the packing boxes required attention, it was necessary to shut down and then partially dismantle the turbines, in order to get at them.

According to the present invention, the turbine is so constructed that the bearing is located at substantially the same position which the packing box of the prior constructions occupied, and the packing box has been relocated so as to be readily accessible for adjustment or repair.

Figure 1:
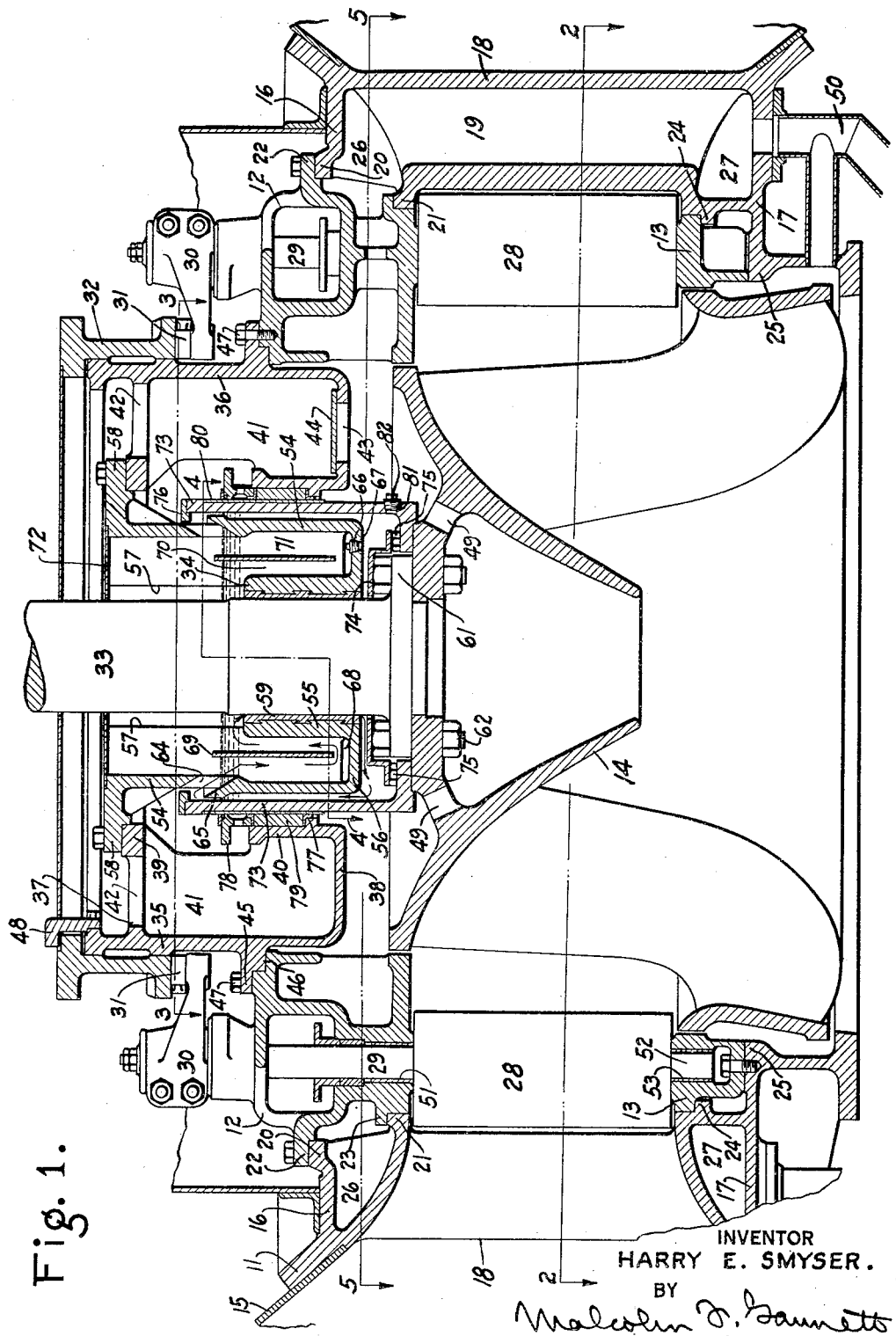
Figure 1 is a vertical section of a hydraulic turbine constructed according to the invention.

Referring to the drawings and especially to Fig. 1, the casing of the turbine comprises a speed ring 11, a top plate 12, and a bottom plate 13. These parts are constructed and arranged in the manner to be hereinafter described to form a housing for a runner 14. The speed ring 11 is preferably mounted in a scroll case 15 of any approved type.

Figure 2:
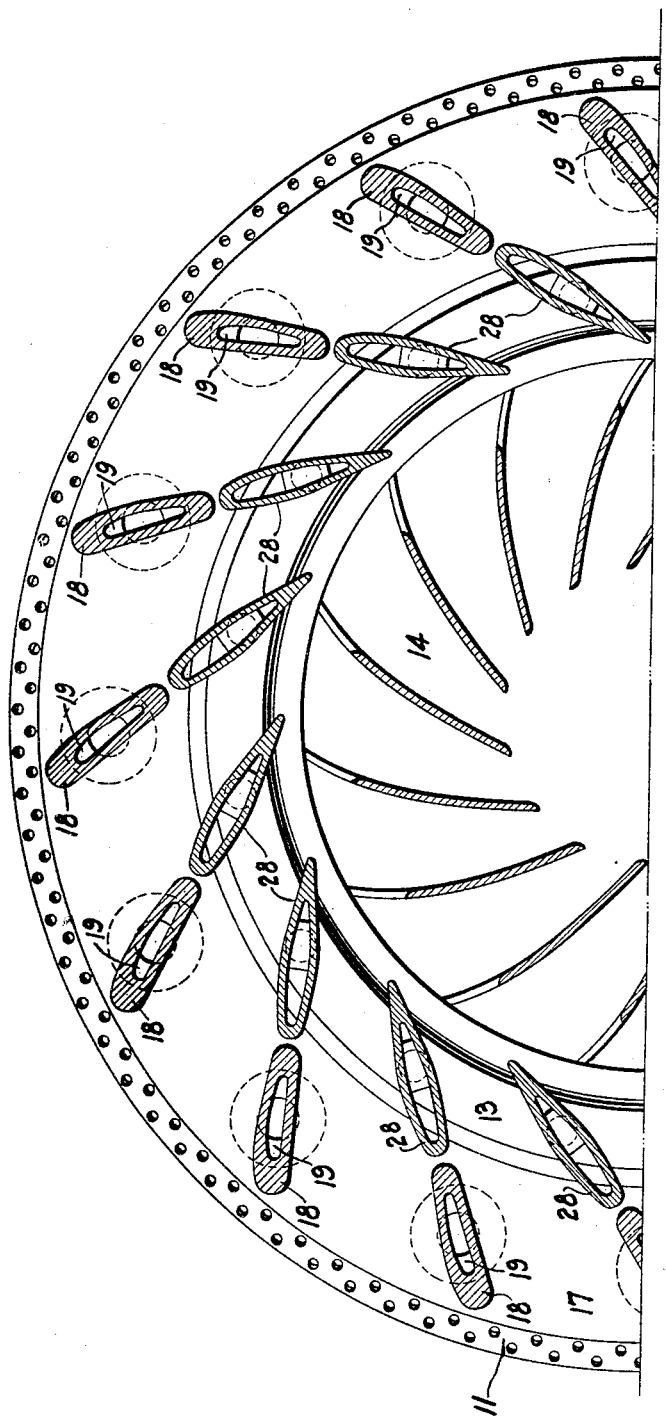
Figure 2 is a half horizontal section taken on the line 2—2 of Figure 1.

The speed ring 11 is formed with upper and lower annular sections 16 and 17, respectively, which are connected at suitable intervals by vertical webs which constitute guide vanes 18. As shown in Figs. 1 and 2, the guide vanes 18 may be hollow, so as to provide openings 19 which extend from the upper section 16 to the lower section 17.

The speed ring 11 forms a peripheral water inlet, and the guide vanes 18 are so disposed in the speed ring as to intercept the water flowing through the speed ring from the scroll case 15 and direct the same into the turbine in a well known manner.

The upper section 16 of the speed ring 11 is formed with a pair of annular flanges 20 and 21, the flange 20 being superposed above the flange 21. The flanges 20 and 21 are adapted to receive correspondingly formed flanges 22 and 23 of the top plate 12, so that said top plate and the parts carried thereby can be rigidly held in position within the speed ring.

The lower section 17 of the speed ring 11 is formed with annular flanges 24 and 25, which are adapted to receive and support the bottom plate 13.

The speed ring 11, top plate 12, and bottom plate 13 may be constructed from castings. When the parts are formed from castings the speed ring may be made in a single piece with the flanges 20 and 21 reinforced by webs 26, as shown in Figs. 1 and 5, and in order to reduce the weight as much as possible, the lower section 17 is formed with chambers 27 which are so formed as to communicate with the openings 19 through the guide vanes 18 in the manner shown at the right in Fig. 1.

Disposed between the top plate 12 and the bottom plate 13, is a plurality of wicket gates 28.

Projecting from the upper end of each wicket gate is a stem 29 which is journalled in a bushing 51 carried by the top plate 12, and projecting from the bottom of each wicket gate is a stem 52 which is journalled in a bearing 53 carried by the bottom plate 13 in the manner shown at the left in Fig. 1.

The wicket gates 28, which are arranged in an annular series within the guide vanes 18, as shown in Figs. 1 and 2, are adapted to be rotated simultaneously into different angular positions to control the flow of water into the turbine in a well known manner.

For the purpose of actuating the wicket gates 28, the upper ends of the stems 29 each carry an operating arm 30. The arms 30 are rigidly mounted on the stems 29 and connected by links 31 to a gate adjusting ring 32. The gate adjusting ring 32 is adapted to be operated in a well known manner, by a governor or other controlling device (not shown).

The hub of the runner 14 is fixed to the lower end of a shaft 33 which is journalled in a suitable oil bearing 34. As shown, the runner is of the Francis type and it is designed for high speed and high efficiency work.

Figure 3:
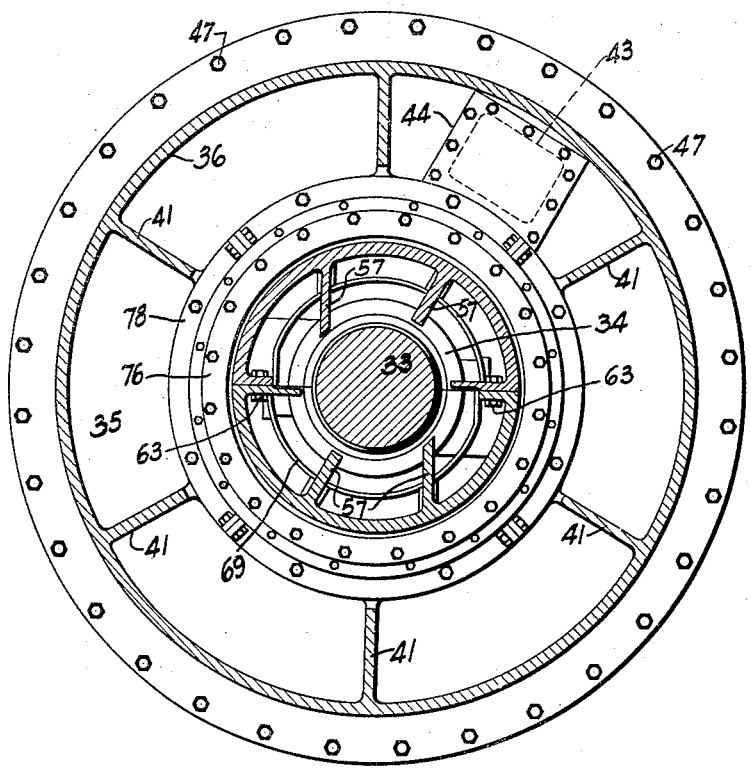
Figure 3 is a horizontal section taken on the line 3—3 of Figure 1.

For the purpose of supporting the bearing 34, I prefer to use a hollow cylindrical shell-like member, which, in the present instance, constitutes a packing box 35 (see Figs. 1 and 3).

As shown, the packing box 35 may be constructed from a single casting consisting of an outer cylindrical vertical wall 36, and top and bottom walls 37 and 38, respectively, which extend inwardly from the outer wall. The top wall 37 terminates in an enlarged annular flange 39, and at the inner edge of the bottom wall 38, there is an annular vertical wall 40 which projects upwardly towards the top wall 37 and terminates a suitable distance therefrom. In order to reinforce the walls of the packing box, radially disposed vertical webs 41 connect the several walls, as shown in Figs. 1 and 3. The top wall 37 is formed with openings 42 which permit access to be had to the interior of the packing box. An opening 43 is also formed in the bottom wall 38 for a purpose to be hereinafter described, and said opening is closed by a cover 44. The bottom of the packing box is closed so as to prevent water from passing upwardly into the packing box.

The packing box 35 is adapted to be supported from the top plate 12 so that the bottom 38 is spaced a suitable distance above the top of the runner, and in order to provide for rigidly mounting the packing box in the top plate, the outer cylindrical wall 36 of the packing box is formed with a flange 45 which has a step formed in its underside for engaging with a correspondingly formed portion 46 in the top plate 12. The packing box is fastened to the top plate 12 by bolts or screws 47, as shown in Fig. 1.

The construction and arrangement of the parts is such that the upper portion of the packing box fits snugly within the gate adjusting ring 32 so as to provide means for supporting said ring. The upper edge of the packing box carries a series of clips 48 which overhang the gate adjusting ring and prevent dislodgment thereof.

In order to provide means for relieving the pressure of the water on the top of the runner 14, the hub of the runner is formed with openings 49 so as to connect the chamber above the runner with the chamber below said runner, and one or more pipes 50 are connected to the lower section 17 of the speed ring 11, so that the periphery of turbine casing is connected with the draft tube beneath the turbine (see Fig. 1).

The main body of the bearing 34 is preferably constructed from a casting, having an outer cylindrical wall 54 adapted to be secured to the packing box 35, and an inner or central cylindrical wall 55 adapted to fit around the runner shaft 33, said walls being spaced apart a suitable distance for a purpose to be hereinafter described. The space between the walls 54 and 55 is open at the top, and said walls are connected at the bottom by a wall 56. Interposed between the walls 54 and 55, are vertical webs 57 (see Fig. 4), which extend from a point near the bottom wall 56 upwardly to the top of the outer wall 54, as shown in Fig. 1. The outer wall 54 is formed with an outwardly extending flange 58 which rests on the flange 39 of the packing box 35, whereby the bearing is suspended from said packing box.

The inner wall 55 is lined with Babbitt metal or other suitable bearing material 59.

The Babbitt lining is formed, at suitable intervals, with vertical grooves 60 (Fig. 4) which are co-extensive with the inner wall of the bearing so as to provide ducts or passageways for the oil, as will be hereinafter more fully described.

Figure 4:
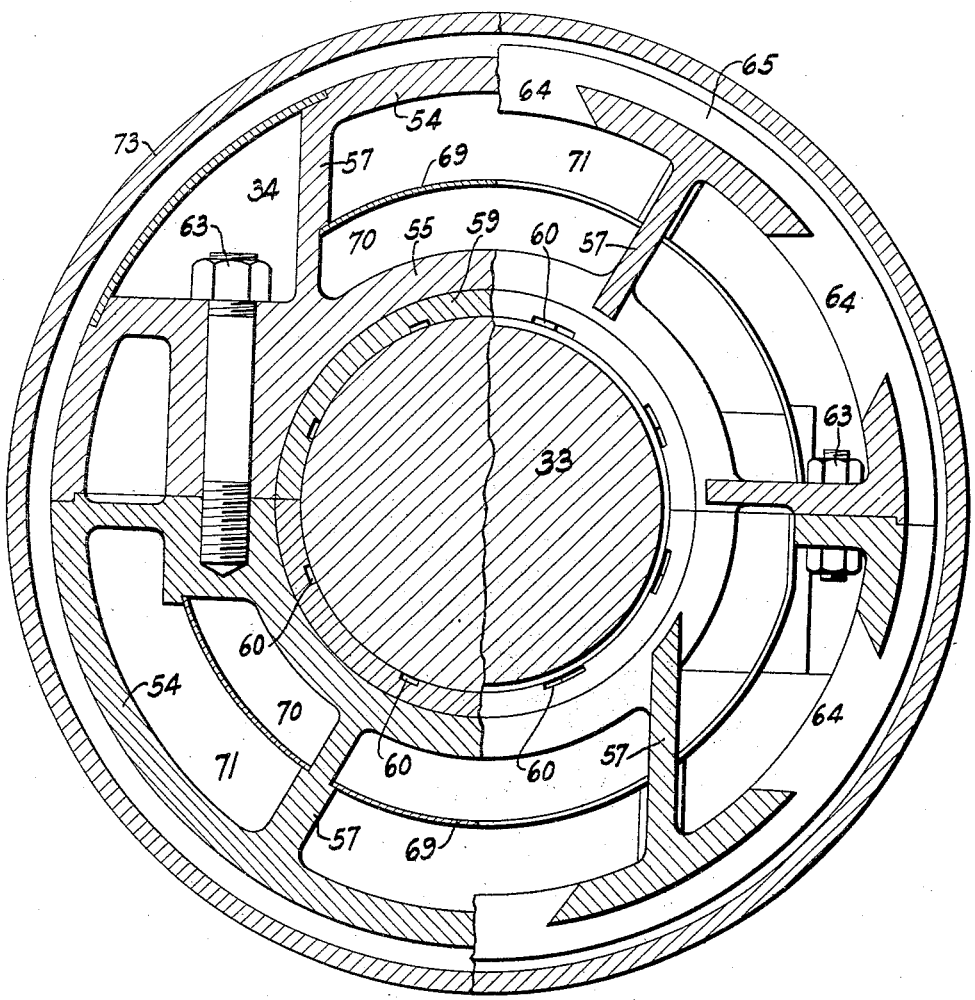
Figure 4 is a similar view taken on the line 4—4 of Figure 1.

The lower end of the shaft 33 is formed with a flange 61 through which bolts 62 are passed for securing the shaft to the hub or crown of the runner 14, as shown in Fig. 1. Since the flange 61 is larger in diameter than the diameter of the inner wall 55 of the bearing, the bearing is made in two semi-circular sections for assembling around the runner shaft. As shown in Figs. 3 and 4, the two sections of the bearing 34 are held together by bolts 63, or other suitable fastening means.

At a point above the top of the inner or central portion 55 of the bearing 34, the outer wall 54 is formed with a series of openings 64. The wall 54 is thickened at the point where the openings 64 are formed therein, so as to provide an outwardly projecting lip 65. As shown in Fig. 1, the upper and lower portions of the openings 64 are inclined downwardly toward the runner shaft 33, and as shown in Fig. 4, the side walls of said openings are bevelled so that the area of the openings is larger at the inner face of the wall 54 than at the outer face of said wall.

The bottom 56 of the bearing 34 is disposed a slight distance above the heads of the bolts 62, the disposition of the parts being such that the bearing engages the runner shaft 33 near the center of gravity or overhang of the turbine runner.

An opening 66 is formed in the bottom wall 56 for the purpose of enabling the oil to be drained from the bearing, and said opening is normally closed by a threaded plug 67.

The vertical webs 57 divide the spaces between the inner wall 55 and the outer wall 54 of the bearing into a plurality of chambers, and since the bottoms of the webs 57 terminate above the bottom wall 56, all of the chambers are connected through the openings 68 thus formed under the webs 57. The oil is thus permitted to circulate through the openings 68 from one chamber to the other in the bearing.

As shown in Figs. 1, 3 and 4, each chamber between the vertical webs 57 is divided by a vertical wall 69, in the form of an arcuate plate which extends circumferentially between the webs 57. The lower edges of the vertical walls 69 terminate a suitable distance above the bottom 56, and the upper edges of said walls project above the normal level of the oil in the bearing, as indicated in Fig. 1, so as to provide a baffle for dividing the spaces between the inner and outer walls of the bearing into a series of inner and outer chambers 70 and 71, respectively.

The top of the bearing 34 is provided with a cover plate 72, which prevents dirt and other foreign matter from falling into the oil.

Surrounding the outer wall 54 of the bearing, and secured to the hub or crown of the runner 32 so as to rotate therewith, is a cylindrical member 73 which constitutes a pan or receptacle for the oil. The bottom of the oil pan 73 is disposed beneath the bottom 56 of the bearing. Overlying the bottom of the oil pan and spaced from the bottom of the bearing, is a plate 74 which covers the bolts 62 which fasten the shaft 33 to the runner 32. The plate 74 is so formed as to also cover the bolts 75 used for securing the oil pan 73 to the runner. The purpose of the plate 74 is to prevent the revolving bolts from agitating the oil in the bottom of the oil pan.

The outer edge of the oil pan 73 extends upwardly to a point approximately opposite to the top of the openings 64 heretofore referred to. Fastened to the top of the oil pan and extending inwardly toward the outer wall 54 of the bearing, is a ring 76, which constitutes a flange for intercepting the oil and deflecting the same toward the openings 64 in the manner to be hereinafter described.

For the purpose of preventing water from passing upwardly around the oil pan 73, a packing is provided between the oil pan and the packing box 35. As shown in Fig. 1 the inner wall 40 of the packing box is formed with a flange 77 which constitutes a sealing ring that projects toward the wall of the oil pan. As shown in Figs. 1 and 3, an annular packing gland 78 is fitted to the top of the wall 40, and suitable packing material 79 is disposed in the space between the sealing ring and packing gland. If so desired the outer surface of the oil pan 73 which is engaged by the packing may be protected by a thin sheet of suitable material 80.

An opening 81 is formed in the bottom of the oil pan 73 so that oil can be drained therefrom, and a screw threaded plug 82 is provided for normally closing the opening.

Heretofore in the construction of vertical hydraulic turbines, the packing was usually located beneath the bearing. With such construction, it was difficult to make inspections, adjustments, or renewals of the packing, due to the fact that the packings were inaccessible. However, by the present construction, it will be noted that the packing gland 78 is readily accessible through the openings 42 in the packing box, so that any adjustments or renewals of the packing can be easily made without the necessity of dismantling any parts of the turbine. This is an important feature of the invention which will be readily apparent to those skilled in the art.

Oil of sufficient quantity to submerge the central portion 55 of the bearing 34 is maintained in the chamber provided by the oil pan 73. The oil is also contained in the chambers 70 and 71, through the connection between these chambers and the oil pan, provided by the openings 68 and the grooves 60. Since the space between the outer wall 54 of the bearing and the side wall of the oil pan 73 is considerably less than the diameter of the outer wall 54, a greater quantity of oil will be contained within the bearing proper than is contained in the chamber exterior thereof provided by the oil pan 73.

In operation, the revolving oil pan 73 produces a centrifugal action of the body of oil in the bearing, and this action creates a suction action which draws oil downwardly through the grooves 60 in the Babbitt lining 59. This results in the oil circulating in the paths indicated by the arrows (see Fig. 1).

As shown by the arrows, from the bottom of the oil pan 73, oil flows upwardly through the restricted space between the outer wall 54 of the bearing and the side wall of the oil pan. The upward movement of the oil is interrupted by the inwardly extending flange provided by the ring 76, which deflects the oil in an inward and downward direction toward the openings 64 in the bearing wall 54. The oil then flows through the openings 64 and into the chambers 71.

Since the walls 69 project above the normal level of oil in the bearings, oil will be prevented from flowing directly toward the shaft 33, and consequently the oil will flow downwardly through the chamber 71 and underneath the walls 69 and the webs 57 and into the chambers 70. The oil then flows in an upward direction through the chambers 70 to the top of the central portion 55 of the bearing and from thence downwardly through the grooves 60 to the bottom portion of the oil pan 73.

It will be apparent that the oil which flows down the runner shaft 33 will be heated, but since water is present in the chamber or space between the top of the runner 14 and the bottom 38 of the packing box 35, and the water surrounds the lower portion of the oil pan 73, the temperature of the oil will be lowered when the oil passes through the bottom portion of the oil pan 73. It will also be noted that due to the location of the packing 79, water will be prevented from passing upwardly around the oil pan and into the top of the bearing 34. In this way the oil will be maintained in the best possible condition during the operation of the turbine and positive circulation of the oil is provided for. In my copending application Serial No. 541,847, filed June 3, 1931, for improvements in hydraulic turbine bearings, I have claimed the particular bearing structure shown herein.

While one illustrative embodiment of the invention has been described in detail, it is not my intention to limit its scope to that embodiment or otherwise than by the terms of the appended claims.

Having thus described my invention what I claim and desire to secure by Letters Patent is:—

1. In a hydraulic turbine, the combination with a casing, of a runner, a shaft connected to the runner, a packing box supported by the casing, a bearing for the shaft carried by said packing box, and a packing gland interposed at a joint between said bearing and said packing box.

2. In a hydraulic turbine, the combination with a casing, of a runner, a vertical shaft connected to the runner, a packing box overlying the runner and supported by the casing, a bearing for the shaft, and a packing gland interposed at a joint between said bearing and said packing box.

3. In a hydraulic turbine, the combination with a runner and a shaft connected thereto, of a speed ring surrounding the runner, top and bottom plates supported by said speed ring, an annular series of wicket gates carried by said plates and disposed within said speed ring for controlling the supply of the driving fluid to the runner, a packing box overlying the runner and supported by said top plate, a bearing for the runner shaft carried by said packing box, a gate adjusting ring also supported by said packing box and operatively connected to the wicket gates, an oil pan encircling the bearing and adapted to rotate with the shaft for circulating oil to the bearing, said oil pan being enclosed by said packing box, and a packing interposed between the packing box and the oil pan.

4. In a hydraulic turbine, the combination with a runner and a shaft connected thereto, of a speed ring surrounding the runner, top and bottom plates supported by said speed ring, an annular series of wicket gates carried by said plates and disposed within said speed ring for controlling the supply of the driving fluid to the runner, a packing box supported by said top plate, a bearing for the runner shaft carried by said packing box, and a packing gland interposed at a joint between said bearing and said packing box.

5. In a hydraulic turbine, the combination with a runner, of a shaft connected to the runner, a casing, a packing box supported by the casing, a bearing for the shaft supported by the packing box and located adjacent to the connection of the shaft with the runner, means for submerging the bearing in oil, and a packing interposed at a joint between the packing box and the bearing for preventing water in the turbine from mixing with the oil in the bearing.

6. In a hydraulic turbine, the combination with a runner, of a shaft having a flange connected to the runner, a bearing located adjacent to the flange of the shaft, and a packing box located above the bearing and supporting the same.

7. In a hydraulic turbine, the combination with a casing, of a runner, a shaft connected to the runner, a bearing for the shaft, means interposed between the casing and the bearing for supporting the bearing whereby said bearing is positioned adjacent to the runner, and a packing gland interposed at a joint between said bearing and its said supporting means, said packing gland being so located in the turbine as to be readily accessible for repair and adjustment.

8. In a hydraulic turbine, the combination with a runner and a shaft connected thereto, of a bearing for the shaft positioned at a point adjacent to the connection between the runner and shaft, an oil pan encircling the bearing and adapted to rotate with the shaft for circulating oil to the bearing, and a packing means surrounding the oil pan.

9. In a hydraulic turbine, the combination with a casing having a runner and shaft mounted therein, of a bearing for the shaft positioned adjacent to the point where the shaft is attached to the runner, an oil pan encircling the bearing and adapted to rotate with the shaft for circulating oil to the bearing, and a packing interposed between the casing and the oil pan.

10. In a hydraulic turbine, the combination with a casing having a runner and a shaft mounted therein, of a bearing for the shaft positioned adjacent to the point where the shaft is attached to the runner, a skeleton housing suspended from the casing for supporting the bearing, an oil pan encircling the bearing and adapted to rotate with the shaft for circulating oil to the bearing, and packing means carried by said housing and engaging said oil pan.

11. In a hydraulic turbine, the combination with a runner and a shaft connected thereto, of a bearing for the shaft, an oil pan encircling the bearing and adapted to rotate with the shaft for circulating oil to the bearing, and a packing means surrounding the oil pan.

12. In a hydraulic turbine, the combination with a casing having a runner and shaft mounted therein, of a bearing for the shaft, an oil pan encircling the bearing and adapted to rotate with the shaft for circulating oil to the bearing, and a packing interposed between the casing and the oil pan.

13. In a hydraulic turbine, the combination with a casing having a runner and shaft mounted therein, of a bearing for the shaft, a skeleton housing suspended from the casing for supporting the bearing, an oil pan encircling the bearing and adapted to rotate with the shaft for circulating oil to the bearing, and packing means carried by said housing and engaging said oil pan.

In testimony whereof I hereunto sign my name.

HARRY E. SMYSER.